Aug. 11, 1942.   E. A. JENSEN   2,292,696
FISH HEAD TRIMMER
Filed June 29, 1940   2 Sheets-Sheet 2
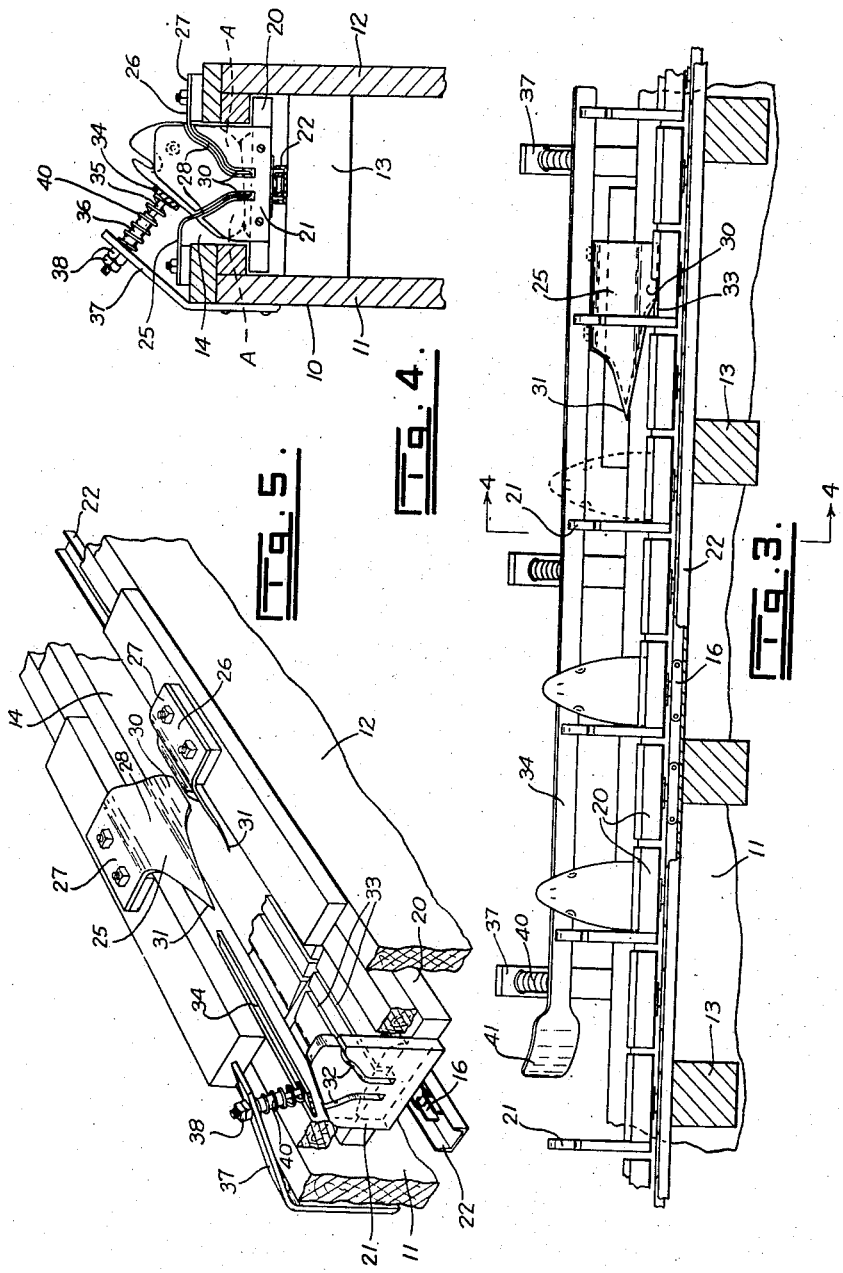
INVENTOR
Ernest Albert Jensen
BY: Eugene E. Stevens
ATTORNEY Patented Aug. 11, 1942

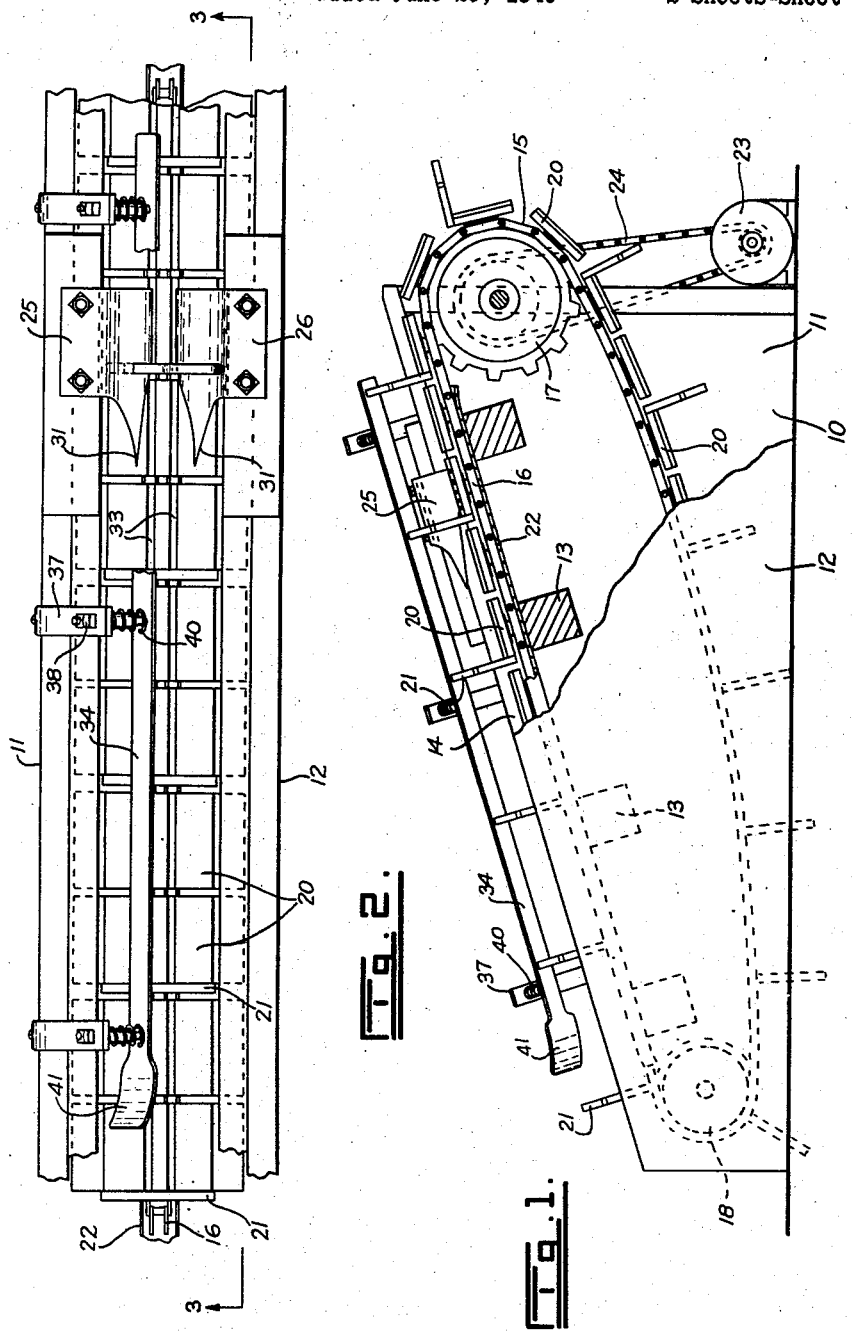

2,292,696

UNITED STATES PATENT OFFICE 2,292,696

FISH HEAD TRIMMER

Ernest Albert Jensen, Vancouver, British Columbia, Canada, assignor to British Columbia Packers Limited, Vancouver, British Columbia, Canada Application June 29, 1940, Serial No. 343,292

6 Claims. (Cl. 17—3)

This invention relates to a fish head trimmer.

An object of the present invention is the provision of a device for trimming fish heads which have been removed from the rest of the fish by hand or machine.

Another object is the provision of a machine for trimming useful flesh from fish heads which is left thereon by the decapitating machines now in common use.

Another object is the provision of a fish head trimmer adapted to leave the gullet attached to the head.

A further object is the provision of a device for rapidly trimming fish heads and which will reduce the time necessary for cleaning the flesh after trimming.

A still further object is the provision of a device of the nature described of very simple and yet efficient construction.

At the present time, in most canneries, the heads of fish are cut off the bodies along a line lying substantially at right angles to said bodies. This results in a valuable piece of flesh being left on the head at each side of the base thereof. Owing to the great number of fish passing through the canneries, this results in a substantial loss unless these pieces are removed in some manner. Until now, this work has been done by hand, a comparatively slow and expensive task. A reasonable amount of care must be taken in this operation in order to avoid mixing the gullets with the trimmed flesh since the former are left in the head pieces cut off by the machines in general use. If the gullets are allowed to remain with the flesh, additional time is wasted in washing them out of the flesh.

According to the present invention, a machine is provided for trimming these pieces of flesh from the fish heads without removing the gullets. To this end, suitable means is provided for moving each head against a pair of knives shaped to trim the flesh off the head as close to the bone as possible. These knives are positioned so as to avoid the gullet, leaving it attached to the head, while suitable means is provided for supporting and retaining each head in position, thus making it possible cleanly to cut the flesh away therefrom.

An example of this invention is described in the following specification and illustrated in the accompanying drawings, in which Figure 1 is a side elevation of the trimmer, with part of the side thereof broken away, Figure 2 is an enlarged, fragmentary plan view of the device, Figure 3 is a longitudinal, sectional view taken substantially along the line 3—3 of Figure 2, with a few heads in the device, Figure 4 is a transverse section taken on the line 4—4 of Figure 3, Figure 5 is a fragmentary, perspective view of the device, showing the knives thereof.

Referring more particularly to the drawings, 10 is a supporting frame having sides 11 and 12 separated by spacers 13 situated below the upper edges of these sides. A trough 14, preferably sloping, is formed above the spacers 13 between the sides 11 and 12, the bottom of this trough being an endless belt 15. This endless belt consists of a chain 16 riding over sprockets 17 and 18 located adjacent the upper and lower ends, respectively, of the trough, said chain having mounted thereon a plurality of carriers 20 at least some of which have backs 21 projecting outwardly therefrom. A channel 22 may be provided along the bottom of the trough 14 through which the chain 16 slides when passing through said trough; and a motor 23 is connected in any suitable manner, such as by a drive chain 24, to the sprocket 17 whereby the belt 15 is moved through the channel.

Knife blades 25 and 26 are supported upon the upper edges of the sides 11 and 12, respectively, adjacent the upper end of the trough 14 and are bent over so that they extend downwardly into the trough, the inner or free edges of these blades being spaced apart and situated substantially centrally of the trough, as clearly shown in Figure 4. Actually, each blade is formed with a substantially horizontal upper section 27, a slightly concave middle section 28 angularly disposed in relation to the upper section, and a lower section 30 lying in a vertical plane. Each middle section 28 extends forwardly or downwardly in the trough and tapers to a point 31. The backs 21 are formed with slots 32 extending therethrough which conform in shape to the cross sectional shape of the blades 25 and 26 so that said blades pass through these slots when the backs move past the former. It is desirable to provide each carrier 20 with spaced longitudinal grooves 33 in its upper surface registering with the slots 32 of the backs in order that the lower sections 30 of the blades 25 and 26 may extend downwardly into these slots as they pass thereby.

A strap 34 is resiliently supported above the trough 14 and the backs 21 in any suitable manner, such as by rods 35 connected at their lower ends to the strap and each of which extend upwardly through a sleeve 36 supported by a bracket 37 carried by the supporting frame 10. The strap 34 may be raised and lowered by means of nuts 39 threaded on to the outer ends of the rods 35 above the brackets 37, and a spring 40 mounted on each rod 35 and sleeve 36 between their bracket 37 and the strap, constantly urges the latter downwardly as far as the nuts 39 will permit. The lower end of the strap is bent outwardly to form a guide 41 while the brackets 37 are bent so that the strap is capable of pressing downwardly and across the trough 14.

In operation, a fish head is placed at the lower end of the trough 14 upon each carrier 20 against its back 21. The head is positioned transversely of the belt 15 upon its base and, as the belt progresses through the trough, the strap 34 presses against the throat of the fish, one corner of the back 21 being cut away to make this possible. This urges the head against the opposite side of the trough and as it is moved forwardly by the back 21 pressing against the head, the latter is firmly held upon the belt. The pressure upon the heads may be regulated by the nuts 38.

With the machinery commonly used in canneries, the fish heads are cut at the bases thereof, leaving portions A of the flesh, see Figure 4, at each side of the base which are valuable for use in food. There is another piece of flesh between the portions A but this is attached to the gullet and, therefore, is not desirable for food purposes.

As the belt 15 progresses through the trough 14, the points 31 of the blades 25 and 26 pierce the head and then the blades cut away the portions A from each side thereof.

Owing to the concave middle sections 28 of these blades, the flesh is trimmed off as close to the bone of the head as possible while the spacing of the lower sections 30 leaves the portion with the gullet attached to the head. As the belt moves further, the head and severed portions are discharged into suitable receptacles (not shown). Each head is firmly held in place by the strap 34 and the back 21 which presses it against the blades. In this way, the blades may be set to trim very closely to the bone of the head since the latter cannot accidently slip out of place.

From the above it will readily be seen that a device has been provided for neatly and efficiently trimming the flesh from fish heads previously severed from the fish bodies, without removing the gullet therefrom, thus saving this flesh and reducing the cost of washing and cleaning fish trimmings.

Various modifications may be made in this invention without departing from the spirit thereof or the scope of the claims and therefore the exact forms shown are to be taken as illustrative only and not in a limiting sense, and it is desired that only such limitations shall be placed thereon as are disclosed in the prior art or are set forth in the accompanying claims.

What I claim as my invention is:

1. A fish head trimmer comprising a supporting frame, a trough formed in the supporting frame, a pair of angularly disposed blades extending downwardly into the trough, each blade being mounted on the upper edge of a side of the trough and the free ends of said blades in the trough being spaced apart, an endless belt running through the trough beneath the blades, means for moving said belt, a plurality of carriers mounted on the belt, backs projecting outwardly from at least some of the carriers, and slots formed in the backs conforming in shape to the cross sectional shape of the blades through which the latter pass as the backs move thereby, said carriers being adapted to receive fish heads transversely positioned thereon on their bases, whereby flesh is trimmed from each side of the heads as they pass the blades.

2. A fish head trimmer comprising a supporting frame, a trough formed in the supporting frame, a pair of concave angularly disposed blades extending downwardly into the trough, each blade being mounted on the upper edge of a side of the trough and the free ends of said blades in the trough being spaced apart, a pointed section projecting outwardly from each blade along the trough, an endless belt running through the trough beneath the blades, means for moving the belt towards the points of the blades, means on the belt for receiving fish heads, said heads being positioned transversely of the belt on their bases, a strap resiliently supported above the belt, said strap extending longitudinally of the trough and being arranged at an angle to the horizontal, and springs mounted on the blade supports normally urging the blade downwardly against the heads on the belt firmly to hold them in their position as they pass the blades, whereby flesh is trimmed from each side of the heads by the blades.

3. A fish head trimmer comprising a supporting frame, a trough formed in the supporting frame, a pair of concave angularly disposed blades extending downwardly into the trough, each blade being mounted on the upper edge of a side of the trough and the free ends of said blades in the trough being spaced apart, a pointed section projecting outwardly from each blade along the trough, an endless belt running through the trough beneath the blades, means for moving the belt towards the points of the blades, a plurality of carriers mounted on the belt, backs projecting outwardly from at least some of the carriers, and slots formed in the backs conforming in shape to the cross sectional shape of the blades through which the latter pass as the backs move thereby, said carriers being adapted to receive fish heads transversely positioned thereon on their bases, whereby flesh is trimmed from each side of the heads as they pass the blades.

4. A fish head trimmer comprising a supporting frame, a trough formed in the supporting frame, a pair of angularly disposed blades extending downwardly into the trough, each blade being mounted on the upper edge of a side of the trough and the free ends of said blades in the trough being spaced apart, an endless belt running through the trough beneath the blades, means for moving said belt, a plurality of carriers mounted on the belt, backs projecting outwardly from at least some of the carriers, slots formed in the backs conforming in shape to the cross sectional shape of the blades through which the latter pass as the backs move thereby, said carriers being adapted to receive fish heads transversely positioned thereon on their bases, and a strap resiliently mounted above the belt, said strap extending longitudinally of the trough and being arranged at an angle to the horizontal to press angularly against the fish heads on the carriers firmly to hold them in position as they pass the blades, whereby flesh is trimmed from each side of the heads by the blades.

5. A fish head trimmer comprising a supporting frame, a trough formed in the supporting frame, a pair of concave angularly disposed blades extending downwardly into the trough, the lower section of each blade lying in a vertical plane and said sections being spaced apart, a pointed section projecting outwardly from each blade along the trough, an endless belt running through the trough beneath the blades, means for moving the belt towards the points of the blades, a plurality of carriers mounted on the belt, backs projecting outwardly from at least some of the carriers, slots formed in the backs conforming in shape to the cross sectional shape of the blades through which the latter pass as the blades move thereby, said carriers being adapted to receive fish heads transversely positioned thereon on their bases, a strap resiliently supported above the belt, said strap extending longitudinally of the trough and being arranged at an angle to the horizontal, and springs mounted on the blade supports normally urging the blade downwardly against the heads on the belt firmly to hold them in their position as they pass the blades, whereby flesh is trimmed from each side of the heads by the blades.

6. A fish head trimmer comprising a supporting frame, a trough formed in the supporting frame, a pair of blades extending downwardly into the trough, each blade having an upper section secured to the trough edge, a concave middle section angularly disposed in relation to the trough and a lower section lying in a vertical plane, the vertical sections of said blades being spaced apart, a pointed portion projecting outwardly from the middle section of each blade, an endless belt running through the trough beneath the blades, means for moving said belt towards the points of the blades, carriers mounted on the belt, backs projecting outwardly from at least some of the carriers, slots formed in the backs conforming in shape to the cross sectional shape of the blades through which the latter pass as the backs move thereby, and spaced longitudinal grooves formed in the upper surfaces of the carriers into which the vertical sections of the blades may extend, said carriers being adapted to receive fish heads transversely positioned thereon on their bases, whereby flesh is trimmed from each side of the heads as they pass the blades.

ERNEST ALBERT JENSEN.